No. 781,582.                                            Patented January 31, 1905.

UNITED STATES PATENT OFFICE.

CHARLES ANDERS, OF JACKSON, MISSISSIPPI.

REVOLVING STALK-CUTTER.

SPECIFICATION forming part of Letters Patent No. 781,582, dated January 31, 1905.

Application filed July 27, 1904. Serial No. 218,405.

*To all whom it may concern:*

Be it known that I, CHARLES ANDERS, a citizen of the United States, residing at Jackson, in the county of Hinds and State of Mississippi, have invented certain new and useful Improvements in Revolving Stalk-Cutters; and I do hereby declare the following to be a full, clear, and exact description of the invention, such as will enable others skilled in the art to which it appertains to make and use the same.

My invention relates to improvements in agricultural field implements, and is particularly applicable for use as a stalk-cutter, although the same may be also used as a clod-crusher or for cutting up turfy ground.

The particular object of the invention is to provide cutter-blades suitably mounted on a revoluble support, which revolving cutter may be readily attached to the forward running-gear of an ordinary farm or other wagon, whereby the necessity of having an independent machine for this purpose is avoided, as the revolving cutter may be readily detached and will occupy but a small amount of storage-space when out of use.

A further object of the invention is to so construct the means for attaching the revolving cutter to the vehicle that the former when not in use might be readily adjusted to adapt the same to uneven surfaces of the soil or completely elevated out of contact when the machine is turned at the end of the field or when it is being hauled from the field to the barn.

To this end the preferred embodiment of my invention consists in the novel construction and arrangement of parts hereinafter described and claimed, and illustrated in the accompanying drawings, wherein the same letters indicate corresponding parts in both views, in which—

Figure 1:
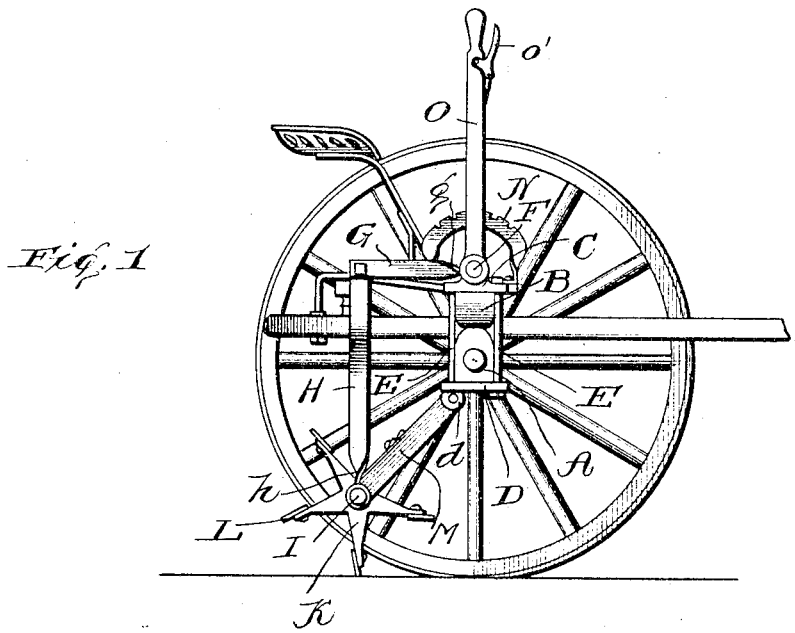
Figure 2:
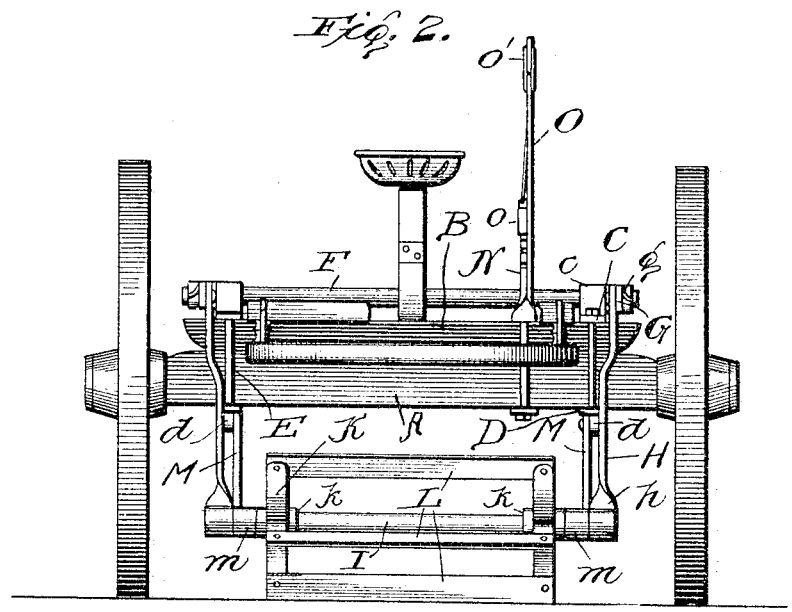

Figure 1 is a side elevation of my improved attachments applied to the forward running-gear of a farm-wagon, the right-hand wheel being omitted to show the parts more clearly; and Fig. 2 is an elevation looking from the rear.

A designates the axle, and B the bolster, of the forward portion of the running-gear of an ordinary farm-wagon, the draft-rigging and its attachments being of the usual construction, as illustrated. At each side of the vehicle is located a stirrup surrounding the bolster and axle, formed by the top plate C, the lower plate D, and the connecting or tie rods E. The upper plates C are provided with the bearings $c$, in which are journaled the ends of a rock-shaft F, disposed longitudinally of the bolster B or transversely of the vehicle, the ends of which rock-shaft extend through and beyond said journal-bearings $c$.

G represents bars twisted and bent upon themselves, as at $g$, to form collars adapted to fit on and be rigidly secured to the projecting ends of the rock-shaft F. To the outer ends of these horizontal bars G are pivotally suspended the vertical bars H, twisted and bent upon themselves, as at $h$, to form a bearing for the shaft I of the rotary cutter. This rotary cutter is of ordinary construction, comprising a plurality of star-shaped wheels K, having the hub portions $k$ in the nature of sleeves loosely journaled on the stationary shaft I, or these hubs may be rigidly secured to the shaft and the shaft loosely journaled in the bearings $h$ of the hanger-bars H. The cutting knives or blades L are detachably secured, by means of bolts or otherwise, to the points of the star-wheels, as clearly illustrated. Between the bearings $h$ and the hubs $k$ and encircling the shaft I are loosely mounted the sleeves $m$, carried by the lower end of the bars M, which bars are disposed upwardly and forwardly and are pivotally secured at their upper ends to studs or lugs $d$, carried by the bottom plates D of the stirrups. These bars M form braces for rigidly maintaining the position of the pivotal hanger-bars H and the rotary cutter, they taking up the rearward strain caused by the tendency of the rotary cutter to swing backwardly.

N is a segmental rack suitably secured to the bolster B, in the notches of which operates a suitable dog $o$, carried by the operating-lever O, which operating-lever is rigidly secured at its lower end to the rock-shaft F and is provided at its upper end with a grip $o'$, operatively connected with the pawl $o$.

The operation of the machine is clear from the foregoing description, and it is obvious that while the revolving cutter may always be held rigidly in position the particular manner of hanging the same allows the same to be nicely adjusted relatively to the ground by the operation of the lever O or completely elevated when the vehicle is to be turned or is being moved to or from the field.

Thus it will be seen that I have invented a simple, cheap, and durable attachment which may be readily attached to or detached from the forward running-gear of an ordinary farm-wagon and which when attached thereto may be further adjustable to suit the conditions of the ground being covered, and although I prefer the construction and arrangements of parts as above described and as illustrated in the drawings it is apparent that many modifications might be made without departing from the true spirit of the invention; but

What I claim is—

1. The combination with the detachable stirrups, of a rock-shaft journaled in the upper ends of said stirrups, an operating-lever secured to said rock-shaft and means for locking same, horizontally-disposed arms twisted and bent upon themselves at their inner ends for forming a sleeve surrounding and rigidly secured to said rock-shaft, vertically-disposed hanger-bars pivotally secured at their upper ends to the outer ends of said horizontal arms and twisted and bent upon themselves at their lower ends to form journal-bearings, a shaft mounted in said journal-bearings, a revolving cutter carried by said shaft, and upwardly and forwardly disposed brace-rods pivotally connected at one end to the shaft of said rotary cutter and at their other ends to the bottom plates of said stirrups.

2. The combination with the detachable stirrups comprising the upper and lower plates, intermediate connections, journal-bearings formed on the upper plates and lugs formed on the lower plates, of a rock-shaft journaled in said bearings, an operating-lever connected to said rock-shaft and means for locking same, of rearwardly-disposed horizontal arms twisted and bent upon themselves at their inner ends forming a sleeve surrounding and secured to said rock-shaft, vertical hanger-bars pivotally secured at their upper ends to the outer ends of said horizontal arms and twisted and bent upon themselves at their lower ends to form journal-bearings, a shaft mounted in said latter bearings, a rotary cutter carried by said shaft, and forwardly and upwardly disposed brace-rods provided with sleeves at their lower ends loosely encircling the shaft of said rotary cutter and pivotally secured at their upper ends to said lugs.

In testimony whereof I affix my signature in presence of two witnesses.

CHARLES ANDERS.

Witnesses:
N. T. ANDERS,
LOUIS ANDERS.